United States Patent [19]

Steinberg et al.

[11] Patent Number: 5,218,993

[45] Date of Patent: Jun. 15, 1993

[54] SERVICEABLE CHECK VALVE

[75] Inventors: Timothy D. Steinberg, Coon Rapids; John M. Svendsen, Corcoran; Wayne M. Bekius, Milaca; John J. Anderley, Anoka, all of Minn.

[73] Assignee: Wagner Spray Tech Corporation, Minneapolis, Minn.

[21] Appl. No.: 891,867

[22] Filed: Jun. 1, 1992

[51] Int. Cl.5 ............................................. F16K 15/14
[52] U.S. Cl. ................................. 137/515.5; 137/843
[58] Field of Search ............................. 137/843, 515.5

[56] References Cited

U.S. PATENT DOCUMENTS

| | | | |
|---|---|---|---|
| 2,339,101 | 1/1944 | Parker | 137/515.5 X |
| 3,340,899 | 9/1967 | Welty | 137/843 X |
| 3,889,710 | 6/1975 | Brost | 137/843 X |
| 4,550,749 | 11/1985 | Krikorian | 137/843 |
| 4,765,372 | 8/1988 | Beecher | 137/843 |
| 4,890,640 | 1/1990 | King | 137/843 X |
| 4,958,661 | 9/1990 | Holtermann | 137/843 |

Primary Examiner—Robert G. Nilson
Attorney, Agent, or Firm—Faegre & Benson

[57] ABSTRACT

An improved check valve assembly of the type having a relatively flexible disc member retained between relatively rigid inflow and outflow housing portions. The inflow and outflow housing portions are removably threadably interengaged to permit serviceability of the check valve and the relatively flexible disc member has a generally perpendicular stem extending into the bore of one of the housing portions to avoid misalignment of the disc with the housing. A tongue and groove means circumferentially seals the housing portions together by deforming to a common taper angle between the tongue and groove to provide sealing therebetween.

11 Claims, 6 Drawing Sheets

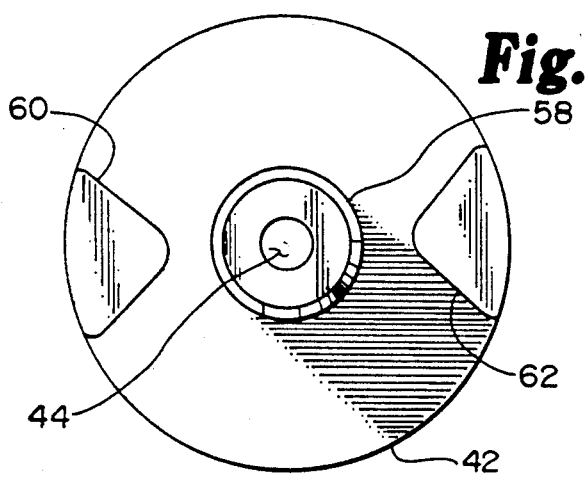
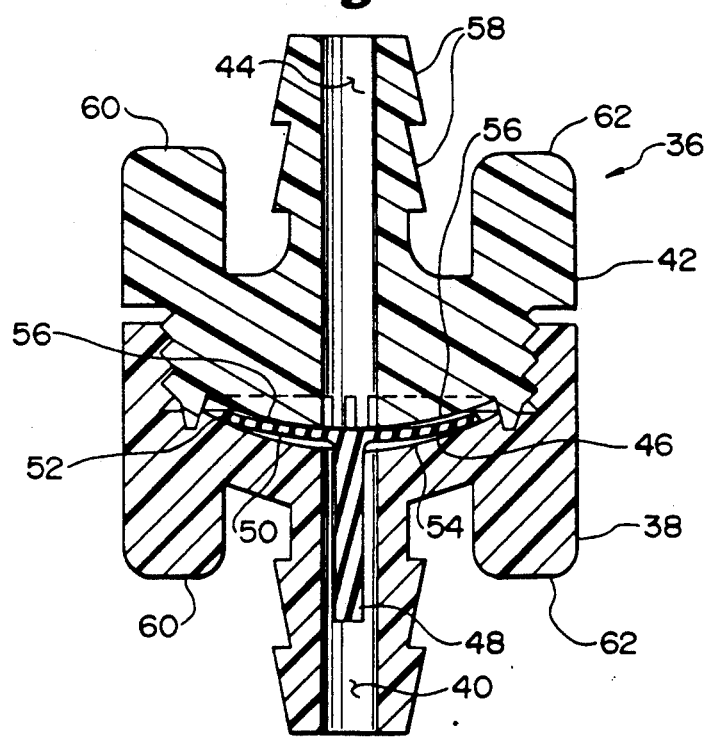
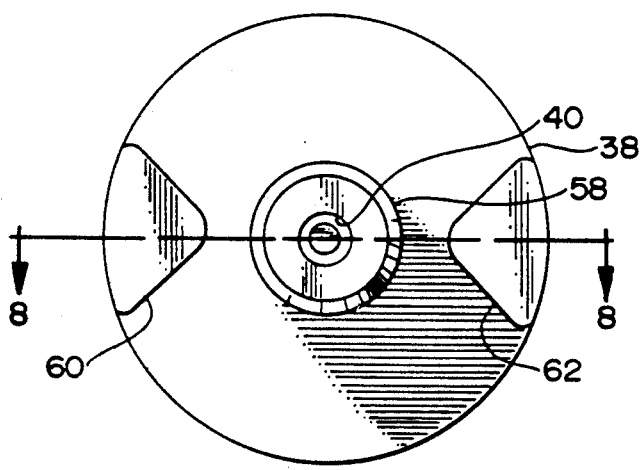

SERVICEABLE CHECK VALVE

FIELD OF THE INVENTION

This invention relates to the field of check valves for fluids, particularly air, and has applicability in portable painting equipment, particularly for venting a paint cup attached to an HVLP paint sprayer.

BACKGROUND OF THE INVENTION

In the past, check valves for air lines have included a two-piece housing (as shown in FIG. 1) with the two pieces permanently joined together. Such prior art check valves also included a resilient disc captured between the inseparable halves to provide the one-way flow characteristic.

Such prior art check valves were not serviceable and required replacement of the entire check valve in the event of contamination or wear out of any of the parts of the valve.

BRIEF DESCRIPTION OF THE DRAWINGS

FIG. 6 is an end on view of a check valve according to the present invention.

FIG. 7 is an end-on view from the opposite end of the check valve of the present invention.

FIG. 8 is a section view taken along line 8—8 of FIG. 6.

DETAILED DESCRIPTION

Figure 1:
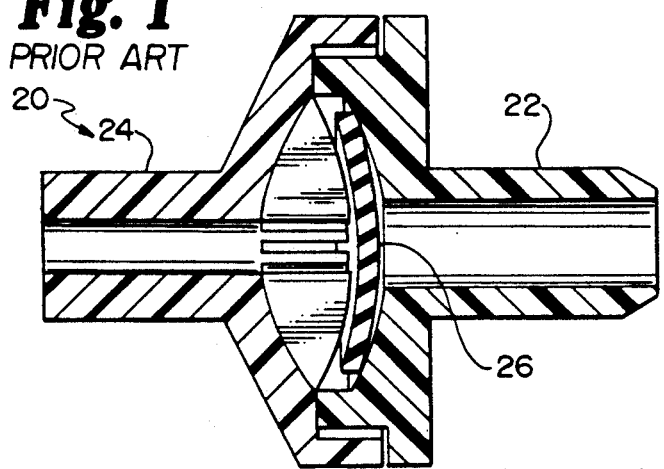
FIG. 1 is a prior art check valve assembly shown in section.
Figure 2:
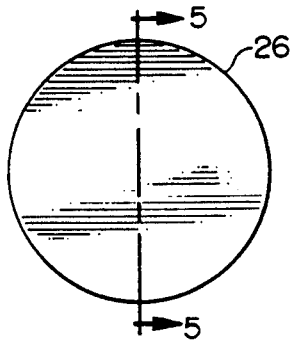
FIG. 2 is an end-on view of the disc-like diaphragm of the prior art check valve of FIG. 1.
Figure 5:
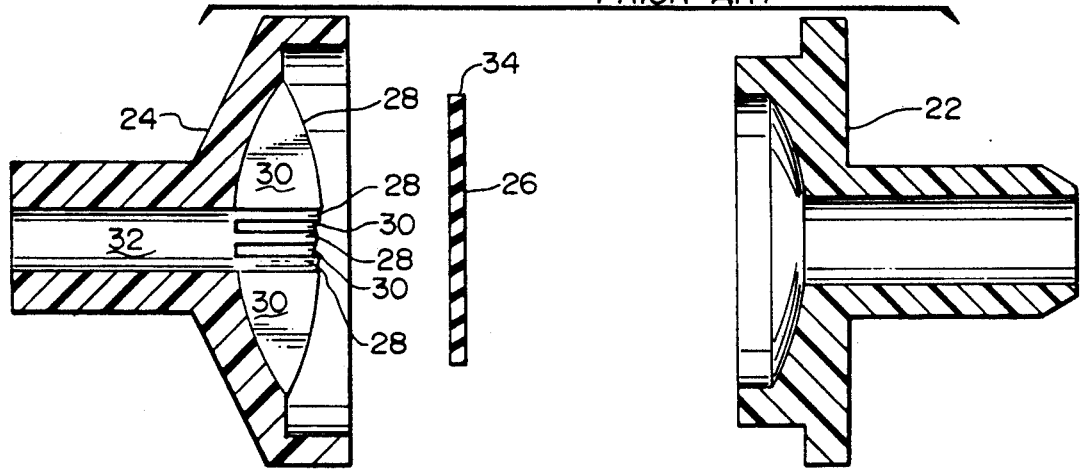
FIG. 5 is an exploded section view of the parts of the prior art check valve assembly shown in FIGS. 2-4.
Figure 4:
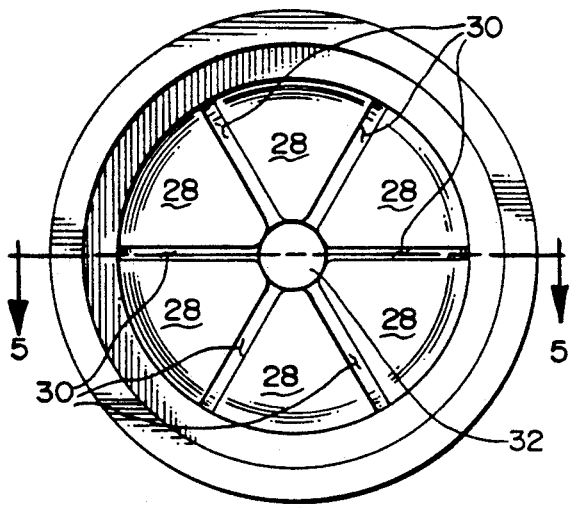
FIG. 4 is an end on view of a second housing portion of the prior art check valve assembly of FIG. 1.
Figure 3:
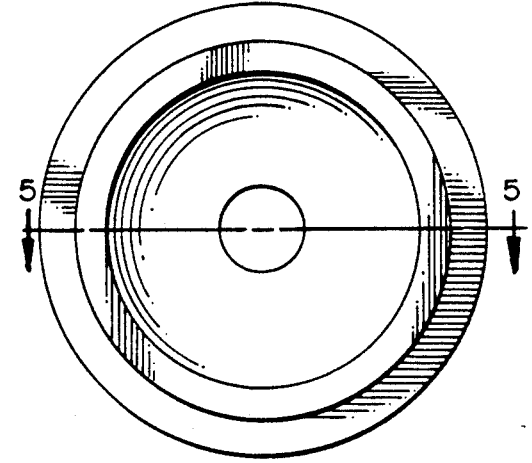
FIG. 3 is an end on view of a first housing portion of the prior art check valve assembly of FIG. 1.
Figure 9:
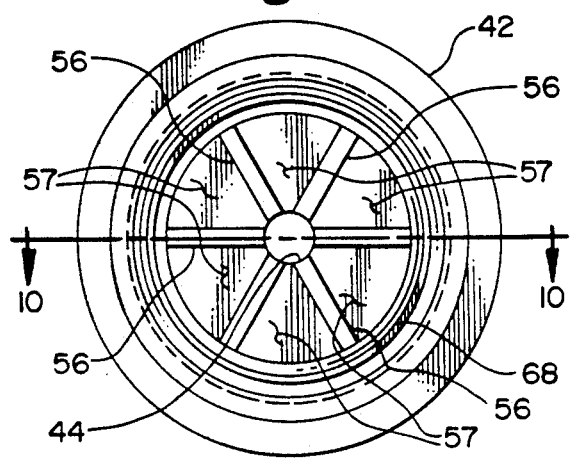
FIG. 9 is an end on view of the first housing portion of the check valve of the present invention.
Figure 10:
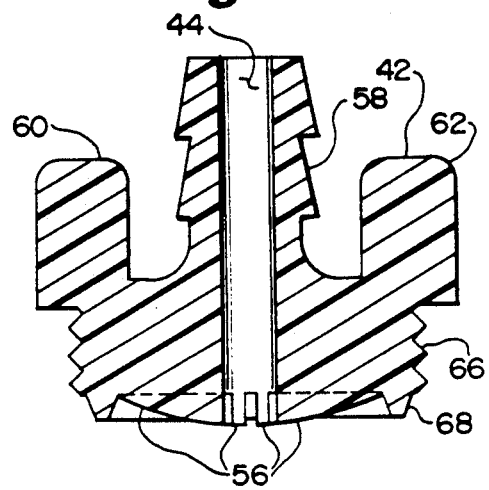
FIG. 10 is a section view taken along line 10—10 of FIG. 9.
Figure 11:
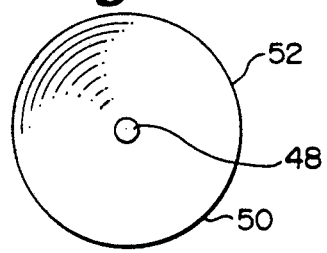
FIG. 11 is an end-on view of a check valve element useful in the practice of the present invention.

A prior art check valve assembly 20 may be seen in FIG. 1. Prior art assembly 20 has a first housing portion 22 and a second housing portion 24, capturing a disc 26 therebetween. In its relaxed state disc 26 is preferable planar, as illustrated in FIG. 5, and in assembly, disc 26 is preferably urged by portion 24 to seal against portion 22 around the periphery of disc 26. Such an arrangement permitted fluid flow from portion 22 to portion 24, but blocked fluid flow from portion 24 to portion 22. It is to be understood that portion 24 has a plurality of convex lands 28 projecting towards portion 22. Lands 28 have a plurality of gaps 30 therebetween to provide fluid communication from a central bore 32 to periphery 34 of disc 26. Housing portions 22 and 24 are sealed together by conventional means such as adhesives or ultrasonic welding. It is to be further understood that portions 22 and 24 are formed of a relatively rigid plastic, while disc 26 was formed of a relatively soft elastomer such as natural or synthetic rubber.

Referring now to FIGS. 6-17, and most particularly to FIGS. 6, 7, & 8, the check valve 36 of the present invention may be seen. Check valve assembly 36 preferably has a relatively rigid inflow housing portion 38 having an inflow bore 40 therethrough. Check valve 36 also preferably has a relatively rigid outflow housing portion 42 having an outflow bore 44 therethrough. A relatively flexible disc member 46 is retained between inflow and outflow housing portions 38, 40 permitting fluid flow from the inflow bore 42 to the outflow bore 44 and blocking fluid flow from the outflow bore 44 to the inflow 40. Disc member 46 has a stem 48 formed integral with an extending generally out of a plane P defined by the periphery of the disc 46. Stem 48 preferably extends perpendicular to plane P and disc head 50. Stem 48 is preferably received in central bore 40 such that disc 46 is restrained from radial misalignment by the reception of stem 48 in bore 40. Although stem 48 is only loosely retained in bore 40, it is sufficient to properly position disk member 46 in the housing portion 38. It is to be understood that in the practice of the present invention stem 48 may alternatively be received in and restrained by bore 44. In FIG. 8 disc stem 50 is shown with an exaggerated deformation to illustrate that, in one embodiment, housing portion 42 preferably deforms disc head 50 to urge the periphery 52 against a generally concave seat 54 in housing portion 38. To accomplish this, housing portion 42 has a plurality of ribs 56 to engage and urge a central portion of disc head 50 toward the concave seat 54. When this embodiment is used, it is to be understood that this engagement and deformation of disc number 46 is preferably very small to allow periphery 52 to release from seating surface 54 with a minimum of fluid pressure in bore 40. A plurality of lands or reliefs 57 are provided between ribs 56 to allow fluid communication between bore 44 and the periphery 52 of disc member 46.

Figure 16:
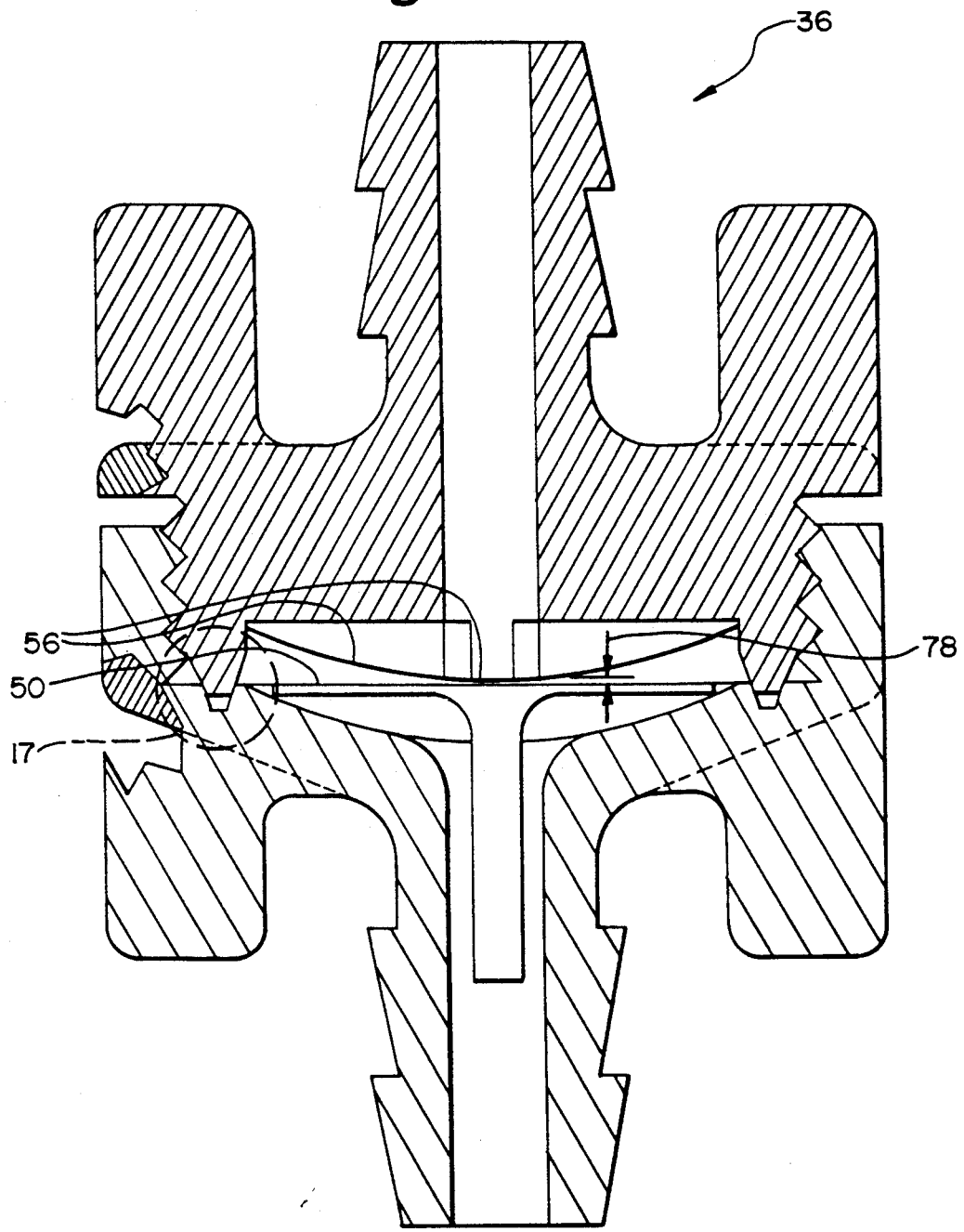
FIG. 16 is a section view of the check valve assembly of the present invention fully assembled.

In another embodiment of this invention it has been found preferable to allow a small clearance between the domed ribs 56 and disk head 50. As shown in FIG. 16, when the check valve 36 is fully assembled, a clearance 78 of 0.004" exists between ribs 56 and disk head 50. In this embodiment, disk member 46 is free-floating between housing portions 38, 42 until fluid pressure or vacuum exists in one or both of ores 40, 44. When fluid pressure exists in bore 44 (or vacuum exists in bore 40 with respect to bore 44) the periphery 52 of disk head 50 is urged against concave seat 54 in housing portion 38, thus blocking fluid flow.

Each of housing portions 38, 42 preferably has conical shaped barbs 58 adapted to receive a mating tube (not shown). Each of housing portions 38, 42 also further has a pair of ears or projections 60, 62 which may be manually grasped to rotate housing portions 38, 42 to assemble and disassemble serviceable check valve has internal threads 64 and outflow housing portion 42 has mating external threads 66. Housing portion 42 has a circumferentially extending tongue 68 and housing portion 38 has a corresponding groove 70 adapted to receive tongue 68. It is to be understood that tongue may be located on portion 38 and groove 70 may be located on portion 42, if desired.

Figure 12:
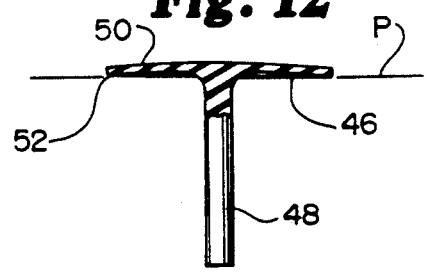
FIG. 12 is a side view partially in section of the check valve element of FIG. 11.
Figure 13:
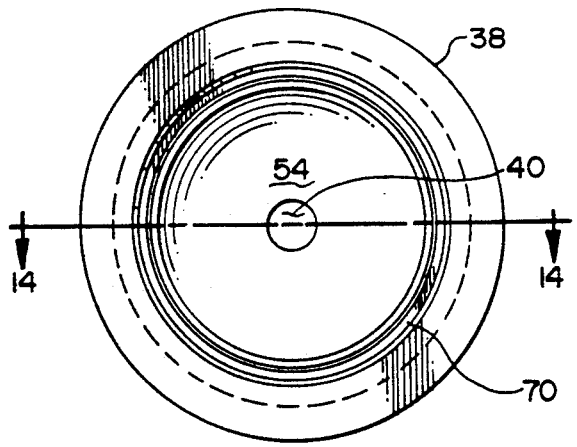
FIG. 13 is an end-on view of a second housing portion of the check valve of the present invention.
Figure 14:
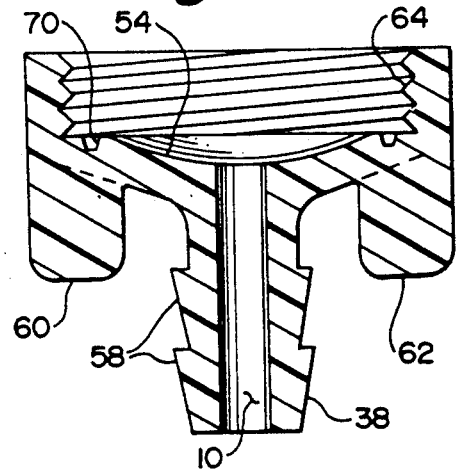
FIG. 14 is a section view along line 14—14 of FIG. 13.

Referring now most particularly to FIG. 12, the head 50 of disc member 46 is preferably slightly "domed." In a preferred embodiment, the diameter of head 50 is preferably 0.4 inches and the radius of the dome is 2.005 inches. In this embodiment, the stem 48 has a diameter of 0.045 inches, and is received in bore 40 of 0.09 inches diameter. In this embodiment, housing portions 38, 42 are preferably formed of ST801 NC10 nylon available from E.I. Dupont de Nemours & Co. Inc. USA: Polymer Products Dept., Wilmington, Del. 19898 and disc member 46 is preferably formed of a low density polyethylene such as type 993 available from the Dow Chemical Co., Olefin & Styrene Plastics Dept., Midland, Mich. 48674.

Figure 15:
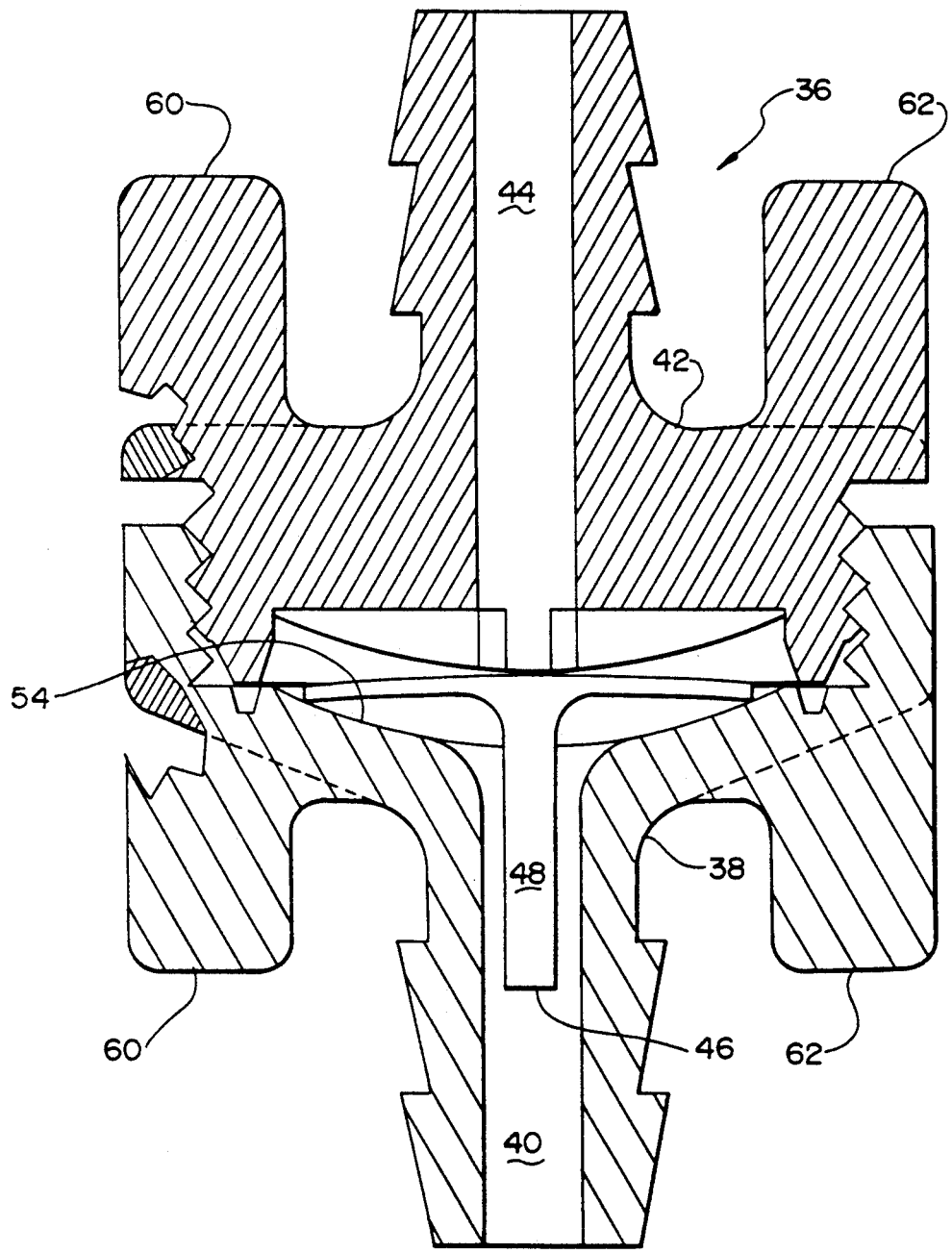
FIG. 15 is a section view of the check valve assembly of the present invention partially assembled.

Referring now to FIG. 15, the check valve of the present invention is assembled by placing disc member 46 together with inflow housing portion 38 such that stem 48 is received in bore 40. Housing portion 42 is then threaded together with housing portion 38 by grasping and rotating ears 60, 62 on each of housing portions 38, 42. As housing portions 38, 42 are rotated with respect to each other, check valve assembly 36 will move from the condition shown on FIG. 15 to that shown in FIG. 16. As indicated in FIG. 16, tongue portion 68 engages groove portion 70 of the interengaging tongue and groove sealing means of the housing.

Figure 17:
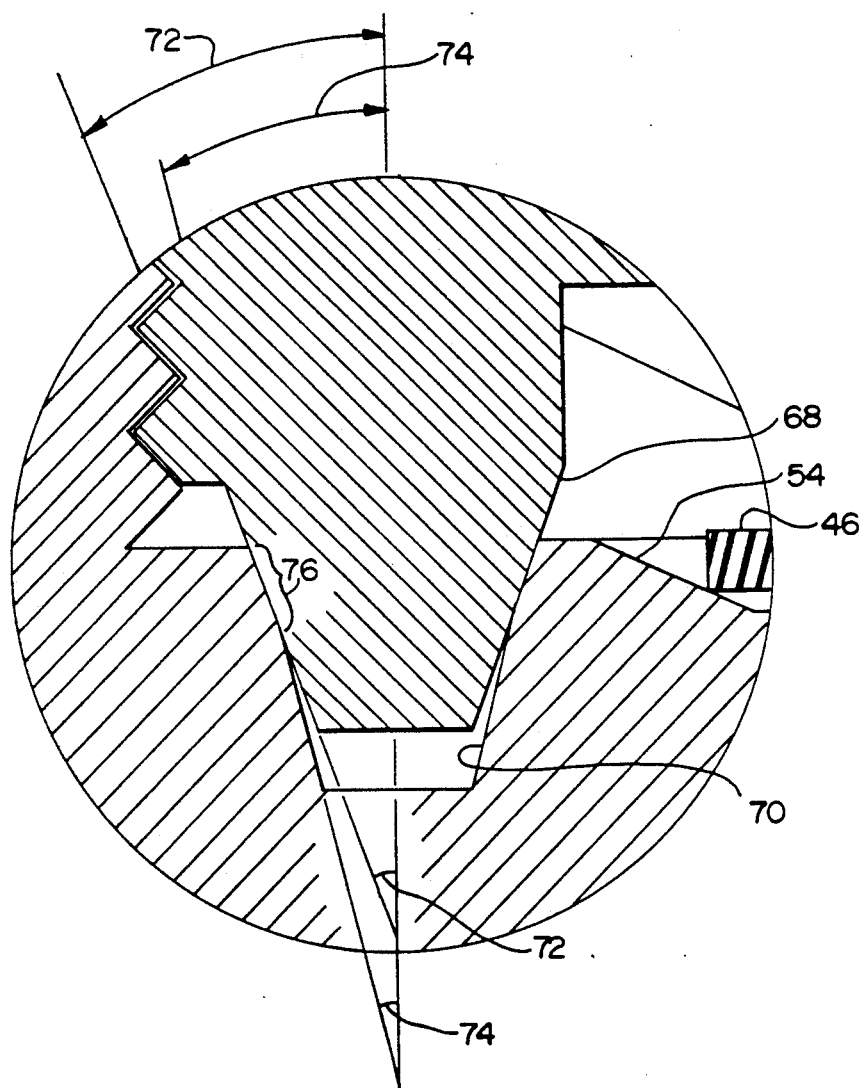
FIG. 17 is an enlarged view of detail 17 of FIG. 16.

Referring now also to FIG. 17, in a preferred embodiment tongue 68 has a taper angle 72 of 20 degrees, while groove 70 has a taper angle 74 of 16 degrees. Tongue 68 thus wedges against groove 70 in region 76 to provide a fluid tight seal between tongue 68 and groove 70. It may also be seen in FIG. 17 that tongue 68 deforms groove 70 in the region 76 to cause the taper angles of tongue 68 and groove 70 to be equal to each other in region 76. As may be seen most clearly in FIG. 17, the tongue and groove means 68, 70 are made up of nesting trapezoidal cross-sections which, when apart (as shown in FIG. 15) are not congruent since the tongue 68 has a taper angle 72 greater than the taper angle 74 of groove 70. This inter-engagement of tongue 68 and groove 70 circumferentially seals the check valve assembly when the inflow and outflow housing portions 38, 42 are threadably fully secured together. It is to be understood that the common taper angle between tongue 68 and groove 70 exists along the portion 76 of the nesting cross-sections that are in contact with each other both on the outside diameter and also on the inside diameter of the tongue and groove means.

The invention is not to be taken as limited to all of the details thereof as modifications and variations thereof may be made without departing from the spirit or scope of the invention.

What is claimed is:

1. In a check valve of the type having a relatively rigid inflow housing portion with an inflow bore therethrough, a relatively rigid outflow housing portion with an outflow bore therethrough, and a relatively flexible disk member retained between the inflow and outflow housing portions for permitting fluid flow from the inflow bore to the outflow bore and for blocking fluid flow from the outflow bore to the inflow bore, the improvement in combination therewith comprising interengaging threads on the inflow and outflow housing portions for threadably retaining the inflow and outflow housing portions together and interengaging circumferential tongue and groove means on the inflow and outflow housing portions for providing a circumferential seal between the inflow and outflow housing portions wherein the tongue and groove means further comprise nesting trapezoidal cross sections.

2. The improved check valve of claim 1 wherein the relatively flexible disk member further comprises a stem formed integral with and extending generally out of the plane of the disk and received in the central bore of one of the inflow and outflow housing portions such that the flexible disk is restrained from radial misalignment by the reception of the stem in the bore.

3. The improved check valve of claim 2 further comprising a concave seat surrounding the central bore in the inflow housing portion and wherein the disk seals against the seat to prevent fluid flow from the outflow portion of the inflow portion.

4. The improved check valve of claim 3 further comprising a plurality of convex ribs surrounding from the central bore in the outflow housing portion and wherein the disk is supported by the ribs to permit fluid flow from the inflow portion to the outflow portion.

5. The improved check valve of claim 4 further comprising a predetermined clearance between the ribs and the disk when the disk is resting against the seat in the inflow housing portion.

6. The improved check valve of claim 1 wherein the trapezoidal cross sections of the tongue and groove means are not congruent.

7. The improved check valve of claim 6 wherein the trapezoidal cross section of the tongue has a taper angle larger than a taper angle of the trapezoidal cross section of the groove.

8. The improved check valve of claim 7 wherein the tongue circumferentially seals against the groove when the inflow and outflow housing portions are threadably secured together.

9. The improved check valve of claim 8 wherein the tongue and groove means deforms to a common taper angle along a portion of the nesting cross sections in contact with each other.

10. In the check valve of the type having a relatively rigid inflow housing with an inflow bore therethrough, a relatively rigid outflow housing portion with an outflow bore therethrough and a relatively flexible disc member retained between the inflow and outflow housing portions for permitting fluid flow from the inflow bore to the outflow bore and for blocking fluid flow from the outflow bore to the inflow bore, the improvement in combination therewith comprising a stem formed integral with and extending generally perpendicularly from the relatively flexible disc member and received in the inflow bore wherein the disc member is urged against the inflow housing portion by the outflow housing portion.

11. The improved check valve of claim 10 wherein the outflow portion has a plurality of axially extending radially oriented ribs surrounding the outflow bore and adapted to urge the flexible disc member towards the inflow housing portion.

* * * * *